UNITED STATES PATENT OFFICE.

CHARLES H. ROBINSON, OF PHILADELPHIA, PENNSYLVANIA, ASSIGNOR TO HIMSELF AND GEORGE T. LEWIS, OF SAME PLACE.

PROCESS OF THICKENING LINSEED-OIL.

SPECIFICATION forming part of Letters Patent No. 414,723, dated November 12, 1889.

Application filed February 9, 1889. Serial No. 299,324. (No specimens.)

*To all whom it may concern:*

Be it known that I, CHARLES HERBERT ROBINSON, of the city and county of Philadelphia, State of Pennsylvania, have invented a new and useful Method of Thickening Linseed-Oil, of which the following is a true and exact description.

My invention relates to the treatment of linseed-oil in order to thicken it for uses such as the manufacture of linoleum, oil-cloth, &c., my present invention being an improvement on the method described in my pending application, filed in the United States Patent Office January 16, 1889, and bearing the Serial No. 296,558, in which application I have described my discovery of the method of thickening linseed-oil by mixing with the raw oil a portion of previously-thickened oil and subjecting the mixture to the action of heat.

My present invention is based on the discovery which I have made that the thickening of the oil is facilitated and a greater improved product obtained by the treatment which consists in first dissolving a portion of previously-thickened oil in raw linseed-oil at a temperature below that at which gases are rapidly driven off from the thickened oil by heat, and then heating the mixture to a high degree to effect the thickening of the mass.

I have found in practice thoroughly satisfactory results can be obtained by mixing raw oil and previously-thickened oil, in the condition of a gummy mass, in the proportion of one hundred to twelve and one-half, and raising the temperature of the mixture to about 350° Fahrenheit and maintaining it at that temperature until the thickened oil is dissolved in the raw oil, then raising the temperature of the mixture to from 600° to 630° Fahrenheit, and maintaining it at such heat until the desired degree of thickening is effected, my experiments indicating that to dissolve the thickened oil in the raw oil at the temperature referred to will require about one and a half to two hours, and that from one to two hours treatment at from 600° to 630° Fahrenheit will result in thickening the oil to substantially the same degree as the thickened oil now used in the manufacture of linoleum, less time of course being required where the oil is not required to be so thick, and the times varying with the quantity under treatment.

My reason for preferring to dissolve the thickened oil in the raw oil at a temperature of about 350° Fahrenheit is that at that temperature but little of the oil is evaporated and lost, and little or no gases are driven off from the previously-thickened oil. If higher heats are used, a considerable loss through evaporation occurs, and if the heat is increased to about 450° Fahrenheit, or above that temperature, gases are rapidly driven off from the previously-thickened oil, and the resultant mixture, after the thickened oil is dissolved, does not thicken so rapidly or perfectly by exposure to high heat.

The oil resulting from the heating of the mixture of raw and thickened linseed-oil at a temperature below that at which gases are rapidly driven off from the thickened oil is itself a valuable and new article of manufacture, and it forms the subject-matter of another application for a patent filed by me February 9, 1889, and bearing the Serial No. 299,325.

Having now described my invention, what I claim as new, and desire to secure by Letters Patent, is—

1. The described method of thickening linseed-oil, which consists of mixing with raw oil a portion of thickened and substantially solidified oil, raising and maintaining the heat of the mixture to a degree below that at which gases are rapidly driven off from the thickened oil until the thickened oil is dissolved, and then raising the temperature of the mixture to effect the desired thickening of the mass.

2. The described method of thickening linseed-oil, which consists of mixing with raw oil a portion of thickened and substantially solidified oil, raising and maintaining the heat to about 350° Fahrenheit until the thickened oil is dissolved, and then raising the temperature of the mixture to effect the desired thickening of the mass.

C. H. ROBINSON.

Witnesses:
LEWIS R. DICK,
FRANCIS T. CHAMBERS.